United States Patent
No et al.

(10) Patent No.: US 9,395,835 B2
(45) Date of Patent: Jul. 19, 2016

(54) LIQUID CRYSTAL DISPLAY PANEL HAVING INTEGRATED PRESSURE SENSING UNITS

(75) Inventors: Sang-Yong No, Seoul (KR); Sang-Youn Han, Cheonan-si (KR); Young-Je Cho, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 1322 days.

(21) Appl. No.: 12/484,660

(22) Filed: Jun. 15, 2009

(65) Prior Publication Data

US 2010/0149128 A1    Jun. 17, 2010

(30) Foreign Application Priority Data

Dec. 11, 2008   (KR) .................... 10-2008-0126062

(51) Int. Cl.
*G06F 3/041*     (2006.01)
*G02F 1/1333*    (2006.01)
*G02F 1/1345*    (2006.01)

(52) U.S. Cl.
CPC .......... *G06F 3/0412* (2013.01); *G02F 1/13338* (2013.01); *G02F 1/13454* (2013.01)

(58) Field of Classification Search
CPC ... G06F 3/0412; G06F 3/044; G02F 1/13338; G02F 1/13454; G02F 1/133707; G02F 1/136213; G02F 1/13394; G02F 1/136227; H01L 27/1214
USPC .......... 345/173–174, 87; 178/18.06; 257/532, 257/535; 349/38–39
See application file for complete search history.

(56) References Cited

U.S. PATENT DOCUMENTS

| | | | | |
|---|---|---|---|---|
| 4,831,431 A * | 5/1989 | Hanlon | ............... | H01L 27/0805 257/535 |
| 5,946,064 A * | 8/1999 | Lee | ................................ | 349/124 |
| 6,259,268 B1 * | 7/2001 | Crozier et al. | ............ | 324/754.03 |
| 2006/0017710 A1 * | 1/2006 | Lee et al. | ........................ | 345/173 |
| 2006/0060752 A1 * | 3/2006 | Lee | ........................ | G06F 3/0412 250/208.1 |
| 2006/0226426 A1 * | 10/2006 | Park et al. | ........................ | 257/59 |
| 2008/0018613 A1 * | 1/2008 | Kim et al. | ..................... | 345/173 |
| 2008/0055267 A1 * | 3/2008 | Wu | ........................ | G06F 3/0412 345/173 |
| 2008/0128859 A1 * | 6/2008 | Chen et al. | ..................... | 257/534 |
| 2008/0129898 A1 * | 6/2008 | Moon | ............................ | 349/12 |
| 2009/0091552 A1 * | 4/2009 | Lee | ........................ | G06F 3/044 345/174 |

(Continued)

FOREIGN PATENT DOCUMENTS

| | | |
|---|---|---|
| JP | 2001-084100 | 3/2001 |
| JP | 2002-073280 | 3/2002 |

(Continued)

*Primary Examiner* — Matthew Fry
(74) *Attorney, Agent, or Firm* — Innovation Counsel LLP

(57) ABSTRACT

Capacitively actuated touch sensor units are integrated between subpixel light emitters of a liquid crystal display panel. In one embodiment, a sensor unit is monolithically integrated on a same substrate as are a plurality of associated subpixel units and the sensor unit includes a variable capacitor and a reference capacitor connected to define a voltage splitting circuit having a split voltage generating node. The sensor unit also includes a sensing transistor operatively coupled to the split voltage generating node and a voltage resetting transistor operatively coupled to the split voltage generating node. In one embodiment, one plate of the variable capacitor is defined by a touchwise flexed portion of a common electrode of the display and an opposed plate is defined by a spaced apart facing electrode provided on a TFT array substrate of the liquid crystal display.

2 Claims, 16 Drawing Sheets

(56) References Cited

U.S. PATENT DOCUMENTS

| | | | |
|---|---|---|---|
| 2009/0115735 A1* | 5/2009 | Chuang | 345/173 |
| 2009/0135158 A1* | 5/2009 | Takahashi | G06F 3/044 345/174 |
| 2009/0160822 A1* | 6/2009 | Eguchi | G06F 3/044 345/174 |
| 2009/0256816 A1* | 10/2009 | Kim | 345/174 |
| 2009/0295747 A1* | 12/2009 | Hsieh | G06F 3/044 345/173 |
| 2010/0013789 A1* | 1/2010 | Chung | G06F 3/044 345/174 |
| 2010/0079402 A1* | 4/2010 | Grunthaner et al. | 345/174 |
| 2010/0156819 A1* | 6/2010 | Takahashi | G06F 3/044 345/173 |
| 2011/0310057 A1* | 12/2011 | Wang | G02F 1/13338 345/174 |

FOREIGN PATENT DOCUMENTS

| | | |
|---|---|---|
| KR | 10-1998-0057643 | 9/1998 |
| KR | 10-2006-0009602 | 2/2006 |
| KR | 10-2007-0000764 | 1/2007 |
| KR | 10-2007-0056549 | 6/2007 |
| KR | 10-2007-0059270 | 6/2007 |
| KR | 10-2008-0020306 | 3/2008 |
| KR | 10-2008-0054546 | 6/2008 |

* cited by examiner

LIQUID CRYSTAL DISPLAY PANEL HAVING INTEGRATED PRESSURE SENSING UNITS

CROSS-REFERENCE TO RELATED APPLICATION

This application claims priority to and the benefit of Korean Patent Application No. 10-2008-0126062 filed in the Korean Intellectual Property Office on Dec. 11, 2008, the entire contents of which application are incorporated herein by reference.

BACKGROUND (a) Field of Invention

The present disclosure of invention relates to liquid crystal displays, and particularly to a contact sensing liquid crystal display panels.

(b) Description of Related Technology

Liquid crystal displays (LCDs) are now widely used as one form of flat panel displays. A liquid crystal display conventionally has two spaced apart substrates, on one of which field generating electrodes such as pixel electrodes are disposed and on the other of which a common electrode is formed. A liquid crystal material layer is interposed between the two substrates. In the liquid crystal display, voltages are applied to the field generating electrodes so as to generate an electric field extending through the liquid crystal material layer. Alignment of liquid crystal molecules in the liquid crystal material layer is controlled by the electric field. In one class of embodiments, the polarization of incident light or backlight is controlled by the alignment of the LC molecules and thus a desired image is formed on the display.

A touch sensitive screen panel is a device that is structured for allowing an associated machine such as a digital computer to perform touch-indicated commands such as the writing of a character, the drawing of a picture, or the executing of an icon in response to touching at a corresponding spot by a user's finger or by a touch pen (or stylus) brought into engagement with a screen surface. In one class of embodiments, the liquid crystal display to which the touch screen panel is attached is used to determine whether a user finger or a touch pen or another surface engaging means touches the screen surface and to determine the touch position information thereof. The cost of the liquid crystal display, however, increases due to mounting of a separate touch screen panel. Because of additional processes for adhering the touch screen panel to the liquid crystal panel, the yield of liquid crystal displays is reduced, the luminance and the viewing angle of the liquid crystal panel are deteriorated, and the overall thickness of the product increases.

In order to overcome such problems, a variety of technologies for integrally embedding sensors in the liquid crystal display have been developed so as to avoid adhering a separate and discrete touch screen panel to the LCD panel. The integrated sensors should be able to determine whether contact is made by a user's finger, and to determine the contact location by for example sensing light variation or pressure variation made by engagement of the user's finger.

In one method of sensing variation of pressure applied to the screen by the user's finger, contact information is obtained through determination of a capacitance variation between two terminals due to corresponding variation of a distance between the two terminals. The applied contact force should be in a range wherein the two terminals of the variable capacitor do not contact each other. If the two terminals are shorted, it is difficult to obtain correct contact information through this method. Thus, according to convention, a relatively large distance between the two terminals must be sufficiently maintained. However, in this case, a cell gap of the liquid crystal display is disadvantageously increased.

On the other hand, the liquid crystal display portion of an integrated touch and display system includes a thin film transistor (TFT) and the thin film transistor includes a semiconductive active layer. However, in the process for manufacturing the thin film transistor, it is not easy to obtain uniform semiconductor characteristics in the semiconductive active layer of the display device. That is, in one type of design, if the characteristics of the thin film transistor are changed, the detection signal of the sensor may also be changed according to its position in the display device relative to varied TFT's. As a result, an error of determination of degree and/or position of contact may be generated.

The above information disclosed in this Background section is only for enhancement of understanding of the technology background of the invention and therefore it may contain information that does not form part of prior art that heretofore is already known to persons of ordinary skill in the art of integrated touch and display systems.

SUMMARY

In accordance with the present disclosure, pressure sensitive sensing units are integrally interposed between subpixel units of a liquid crystal display panel for accurately detecting application of pressure to a given portion of a common electrode used by the subpixel units to provide a common voltage to the subpixel units. Gate lines of the liquid crystal display panel are used to selectively activate one row at a time of the pressure sensitive sensing units for thereby cause them to output their respective pressure indicating signals. Sensing signal carrying lines of the sensing units are interspersed in parallel with data carrying lines of the subpixel units.

A first exemplary embodiment comprises a plurality of sub/pixel units integrally disposed on a light-passing substrate where each sub/pixel unit includes a liquid crystal capacitor formed of a respective pixel electrode and a respective first portion of a panel common electrode, where two or more of the sub/pixel units have integrally interposed therebetween; a pressure sensing unit that includes a voltage change sensing electrode; an insulating layer formed on the sensing electrode and extending onto the pixel electrodes of adjoining sub/pixel units; and a liquid crystal molecules aligning layer formed on the insulating layer.

The pressure sensing unit may further include a variable capacitor having a capacitance that is changed by application of a pressure to a corresponding portion of the display panel where the variable capacitor has respective first and second capacitor plates, formed by, or connected to, the respective sensing electrode and a second portion of the common electrode, and where the voltage sensing electrode generates a pressure detection signal in response to a selective control voltage applied to a voltage splitter formed by the variable capacitor and by a reference capacitor included in the pressure sensing unit and having a respective third capacitor plate defined by or connected to the sensing electrode.

In one embodiment, each pressure sensing unit includes a first gate line segment and a second gate line segment respectively connected to gate lines of a neighboring subpixel unit. Each pressure sensing unit further includes sensing signal line segment extending substantially in parallel with data lines of adjacent subpixel units.

In one embodiment, each sensing unit further includes a first switching element transmitting a reset voltage to the sensing electrode in response to application of an activating gate signal of the second gate line segment.

Other aspects of the disclosure are provided in the below detailed description section.

DETAILED DESCRIPTION

The present disclosure of invention is provided in will more detail hereinafter with reference to the accompanying drawings, in which exemplary embodiments are shown. As those skilled in the art would realize, the described embodiments may be modified in various different ways without departing from the spirit or scope of the present disclosure.

A first liquid crystal display according to an exemplary embodiment of the present disclosure will be described with reference to FIG. 1 to FIG. 3.

Figure 1:
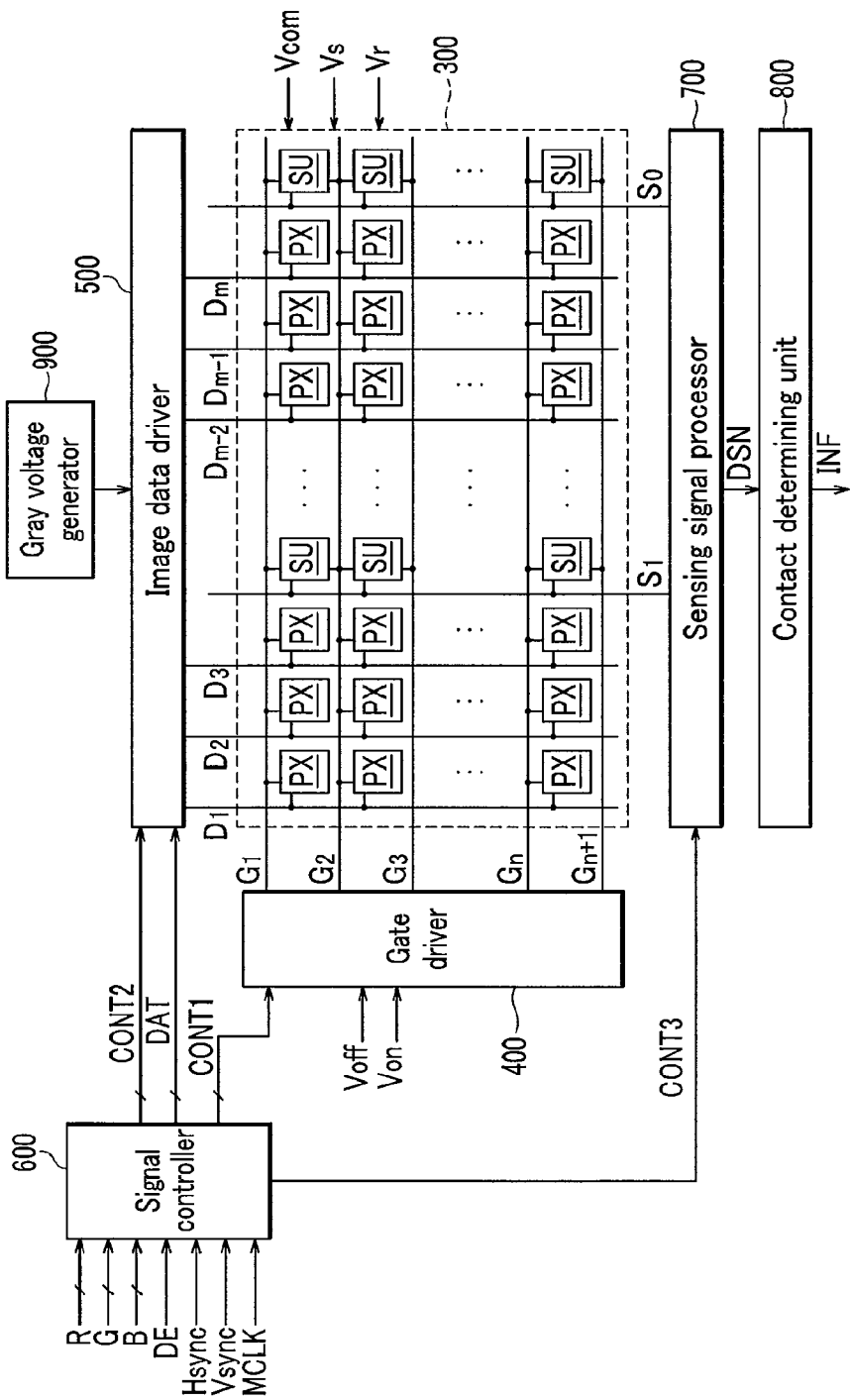
FIG. 1 is a block diagram of a liquid crystal display according to an exemplary first embodiment.
Figure 2:
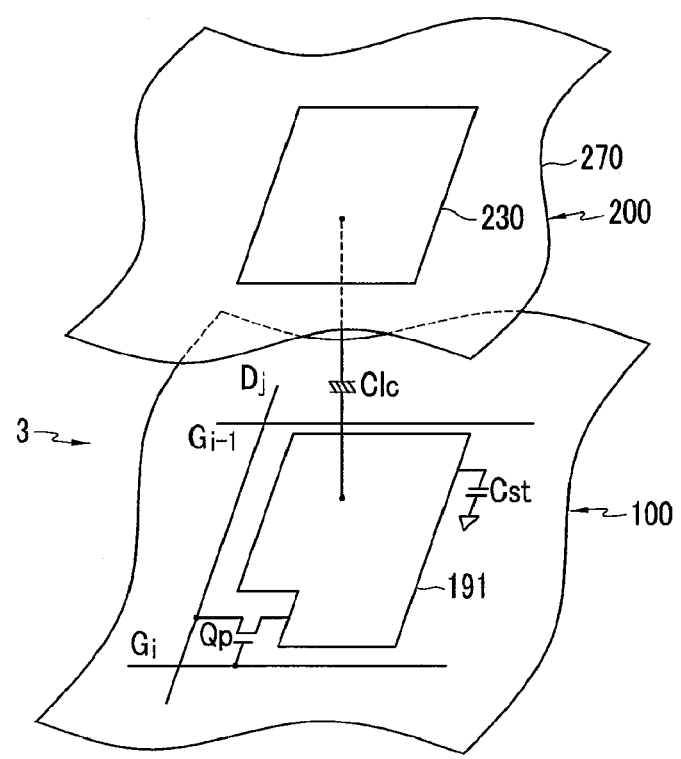
FIG. 2 is an equivalent circuit diagram of one pixel or subpixel unit (PX) in the liquid crystal display shown in FIG. 1.
Figure 3:
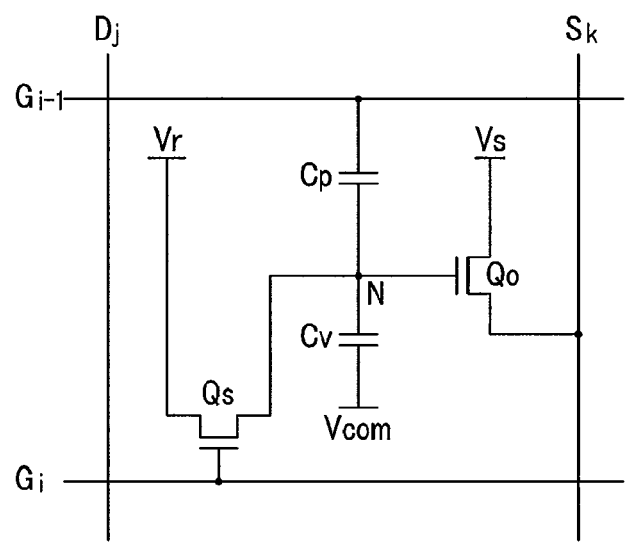
FIG. 3 is an equivalent circuit diagram showing a sensing unit (SU) in a liquid crystal display according to an exemplary embodiment.

FIG. 1 is a block diagram of a liquid crystal display according to an exemplary first embodiment, FIG. 2 is an equivalent circuit diagram of one pixel or subpixel unit (PX) in the liquid crystal display shown in FIG. 1, and FIG. 3 is an equivalent circuit diagram showing a sensing unit (SU) in a liquid crystal display according to an exemplary embodiment. The terms "pixel unit" and "subpixel unit" are on occasion used intermixingly herein although they may refer to slightly different entities. Depending on point of view, pixel unit may be considered as a repeating cluster of subpixel units such as RGB subpixels whereby the pixel unit can then display a variety of different colors as respective mixtures of R, G and B intensities. Alternatively, from another point of view, any individually addressable and controllable picture element may be considered as a pixel unit. In general therefore, the unit identified as "PX" herein is referred to as a sub/pixel unit (PX) so as to cover both points of view and the term "dot" is occasionally used to refer to a repeating group of subpixel units such as the RGB repeating group.

As shown in FIG. 1, a liquid crystal display according to an exemplary embodiment includes a liquid crystal panels assembly 300 (upper and lower substrates), a gate driver circuit 400 (e.g., monolithic integrated circuit), a data driver circuit 500 (e.g., one or more IC's), a sensing signal processor 700, a contact determining unit 800, a gray voltage generator 900, and signal controller 600.

Referring to FIG. 1, in a view of an equivalent circuit, the display panels assembly 300 includes a plurality of respective gate, data and sensor signal lines, $G_1$-$G_{n+1}$, $D_1$-$D_m$, and $S_1$-$S_o$, and a plurality of sub/pixel units PX and a plurality of sensing units SU integrated therein and arranged substantially as a matrix. The sensing units SU are interspersingly disposed near the sub/pixel units, and each of the sensing units SU may be arranged as part of a corresponding vertical column of sensing units in the matrix with sub/pixel units PX also disposed as columns where these columns are substantially parallel to the image data lines $D_1$-$D_m$. In one embodiment, one column of sensing units is positioned after every three successive columns of sub/pixel units PX. (In the case where 3 subpixels make an RGB "dot", it may be said that the sensing units of that case are provided at a rate of one per dot.)

Meanwhile, in a viewpoint of the structure of FIG. 2, the liquid crystal panels assembly 300 includes a lower panel 100 and an upper panel 200 facing each other, and a liquid crystal layer 3 interposed therebetween.

The signal lines $G_1$-$G_{n+1}$, $D_1$-$D_m$, and $S_1$-$S_o$, include a plurality of gate lines $G_1$-$G_{n+1}$ transmitting respective image row scanning signals, a plurality of data lines $D_1$-$D_m$ transmitting respective image data signals, and a plurality of sensing data lines $S_1$-$S_o$ transmitting respective sensing data signals.

The gate lines $G_1$-$G_{n+1}$ extend in an approximate row direction and run substantially parallel to each other, and the image data lines $D_1$-$D_m$ and the sensing data lines $S_1$-$S_o$ extend in an approximate column direction and run substantially parallel to each other.

Each of the sub/pixels PX include a switching element Qp (e.g., a TFT) connected to a respective crossing pair of the display signal lines $G_1$-$G_{n+1}$, $D_1$-$D_m$, and a liquid crystal capacitor Clc and a storage capacitor Cs connected thereto. The storage capacitor Cst may be omitted, if desired.

The switching element Qp as a three-terminal element such as a thin film transistor (TFT) is provided on the thin film transistor array panel 100, which includes a control terminal connected to the gate lines $G_1$-$G_{n+1}$, an input terminal connected to the data lines $D_1$-$D_m$, and an output terminal connected to the liquid crystal capacitor Clc and to the storage capacitor Cst. Here, the thin film transistor may include an active layer composed of amorphous silicon or polysilicon.

The liquid crystal capacitor Clc has a pixel electrode 191 of the lower panel 100 and a portion of the common electrode 270 of the common electrode panel 200 as its two capacitor terminals, and the liquid crystal layer 3 between the two electrodes 191 and 270 serves as a dielectric material. The pixel electrode 191 is connected to the switching element Qp, and the common electrode 270 that is formed on the whole surface of the common electrode panel 200 receives a common voltage Vcom. Differently from FIG. 2, the common electrode 270 may be formed on the thin film transistor array panel 100, and one at least of the two electrodes 191 and 270 may have a linear shape or a bar shape.

The storage capacitor Cst that serves as an auxiliary charge storage to the liquid crystal capacitor Clc and is formed as a separate signal line (not shown) provided on the lower panel 100 and the pixel electrode 191 overlapping it with an insulator interposed therebetween, and a predetermined voltage such as the common voltage Vcom or the like is applied to the separate signal line. However, the storage capacitor Cst may be formed by overlapping the pixel electrode 191 and the previous gate line via the insulator.

Meanwhile, in order to realize color display, each subpixel PX uniquely displays one of primary colors (spatial division), or each pixel PX temporally and alternately displays primary colors (temporal division). Then, the primary colors are spatially or temporally synthesized, and thus a desired color is recognized. Examples of the primary colors may include three primary colors of red, green, and blue (RGB). FIG. 2 shows an example of the spatial division. In FIG. 2, each subpixel unit PX has a color filter 230 that represents one of the primary colors in a region of the upper panel 200. Unlike FIG. 2, the color filter 230 may be formed above or below the subpixel electrodes PEa, PEb, or PEc of the lower display panel 100.

At least one polarizer (not shown) for providing light polarization is provided in the liquid crystal panels assembly 300.

Referring to FIG. 3, each sensing unit SU includes a variable capacitor Cv, a reference capacitor Cp, coupled to define a voltage splitting circuit having a split voltage generating node, N, and a first transistor Qs (voltage resetting transistor), and a second transistor Qo (voltage sensing transistor) operatively coupled to the split voltage generating node, N.

More specifically, one end of the variable capacitor Cv is connected to the reference capacitor Cp and to the first and second transistors Qs and Qo at the split voltage generating node, N (also referred to herein as 'contact point N'), and other end of the variable capacitor Cv is connected to the common voltage Vcom.

One end of the reference capacitor Cp is connected to the variable capacitor Cv, and to the first and second transistors Qs and Qo at the contact point N, and other end of the reference capacitor Cp is connected to the previous gate line $G_{i-1}$.

The first and second transistors Qs and Qo as three terminal elements each have an output terminal, an input terminal, and a control terminal (gate). The input and output terminals are at times referred to as source and drain terminals.

The control terminal of the first transistor Qs is connected to the gate line $G_i$, the input terminal is connected to the reset voltage Vr, and the output terminal is connected to the variable capacitor Cv, the reference capacitor Cp, and the second transistor Qo at the contact point N.

The control terminal of the second transistor Qo is connected to the variable capacitor Cv and to the reference capacitor Cp and to the drain of the first transistor Qs at the contact point N, the input terminal (source) is connected to the source driving voltage Vs, and the output terminal (drain) is connected to the sensing data line $S_k$.

The capacitance of the variable capacitor Cv is changed according to an external touch of a user applied to the liquid crystal panels assembly 300. For example, the external touch may be a pressure. When pressure is applied to the common electrode panel 200, a spacer therebetween is compressed and a distance between two terminals changes. As a result, the capacitance of the variable capacitor Cv changes. When the capacitance changes, a voltage at the contact point N (which point is between the reference capacitor Cp and the variable capacitor Cv) changes because the voltage of the contact point N relies on a ratio that is function of the capacitances Cv and Cp. The second transistor Qo, when turned on, flows a sense current whose magnitude is a function of the difference between the voltage, $V_N$ at the contact point N and a source reference voltage, $V_S$ provided to a source terminal of the second transistor Qo (in other words, $V_{GS}=V_N-V_S$). The current of the turned on Qo transistor flows as an analog sensing signal through the sensing data line $S_k$. In other words, based on the voltage $V_N$ at the contact point N, the sensing unit (SU) can provide a determination as to whether pressure contact is made or not and as to the force applied by the making of such contact.

In one embodiment, sensing units SU are disposed at a dispersion rate of one for each dot (e.g., RGB) in the liquid crystal panels assembly 300, and in the region (hereinafter referred to as a sensing region) between the two neighboring subpixels PX. As an example, one of the dots includes three subpixels PX respectively displaying the three primary colors, R, G and B that are arranged in the transverse direction and such a dot may be deemed as a basic unit displaying one color as a mixture of different brightnesses of the RGB primaries, where spacing of the dots or the subpixels generally defines resolution of the liquid crystal display. The resolution of the sensing units SU can be increased or decreased as desired by altering the dispersion rate of sensing units SU per a given number of subpixels as taken in the horizontal (row) and/or vertical (column) direction as deemed appropriate.

Referring to again FIG. 1, the gray voltage generator 800 may generate all the gray scale analog voltages or a predetermined number of gray voltages (hereinafter referred to as "reference gray voltages") that are related to commandable light transmittances of each sub/pixel PX. The (reference) gray voltages may have a positive value or a negative value (or both if polarity reversals are being used) relative to a common voltage Vcom.

The data driver 500 is connected to the image data lines $D_1$-$D_m$ of the liquid crystal panels assembly 300, and it selects a gray voltage from the gray voltage generator 800 and applies the selected gray voltage (or an extrapolated version thereof) as a data voltage to the data lines $D_1$-$D_m$. However, when the gray voltage generator 550 does not provide all gray voltages but provides only a predetermined quantity of reference gray voltages, the data driver 500 generates a desired data voltage by for example dividing between the reference gray voltages and providing extrapolated reference values according to the divisions.

The gate driver 400 is connected to the gate lines $G_1$-$G_{n+1}$ of the liquid crystal panels assembly 300 to apply a gate line driving signal to each whose waveform comprises a combination of a gate-on voltage level, Von for turning on the sub/pixel switching element Qp and a gate-off voltage level, Voff for turning off the switching element Qp, where the turn on level is progressively shifted from one to the next among the gate lines $G_1$-$G_{n+1}$.

The sensing signal processor 700 is connected to the sensing data line $S_1$-$S_o$ of the liquid crystal panels assembly 300 and receives the sensing signal output through the sensing data lines $S_1$-$S_o$. The output sensing signal is subjected to further analog signal processing a such as to amplifying and filtering, and an analog-to-digital converter (not shown) converts the processed sensing signal to generate a corresponding digital detection signal DSN.

The contact determining unit 800 receives the digital detection signal DSN from the sensing signal processor 700 and performs its contact determining function by executing for example a predetermined digital processing operation which determines existence of a touch and a touch position, and sends contact information INF to the outside (e.g., to a host computer for further processing). The contact determining unit 800 monitors an operation state of the sensing units SU based on the digital detection signal DSN to control a drive signal (e.g., Vs) that is applied to these sense units.

The signal controller 600 controls the gate driver 400, the image data driver 500, the gray voltage generator 550, and the sensing signal processor 700.

Each of the driving devices 400, 500, 600, 700, 800, and 900 may be directly mounted on the liquid crystal panels assembly 300 in the form of at least one monolithic integrated circuit (IC) chip, or they may be mounted on a flexible printed circuit film (not shown) to be attached to the liquid crystal panels assembly 300 in a form of a tape carrier package (TCP), or they may be mounted on a separate printed circuit board (PCB) (not shown). Alternatively, the driving devices 400, 500, 600, 700, 800, and 900 may be integrated with the liquid crystal panels assembly 300, together with the signal lines $G_1$-$G_{n+1}$, $D_1$-$D_m$, and $S_1$-$S_o$, and the thin film transistor switching elements Qp. The drivers 400, 500, 600, 700, 800, and 900 may be integrated into a single chip. In this case, at least one of the drivers or at least one circuit forming the drivers may be arranged outside the single chip.

Hereinafter, an operation and a sensing operation of a liquid crystal display according to a first embodiment will be described in detail.

Referring to FIG. 1, the signal controller 600 receives input image signals Din (e.g., R, G and B) from an external graphics controller (not shown) and an input control signal ICON (e.g., Hsync, Vsync, etc.) for controlling the display of the received input image signals. Each of the input image signals Din includes information about luminance of each sub/pixel PX. The luminance has the predetermined number of grays, for example, $1024=2^{10}$, $256=2^8$, or $64=2^6$. For example, the input control signal includes a vertical synchronization signal Vsync, a horizontal synchronizing signal Hsync, a main clock signal MCLK, and a data enable signal DE.

The signal controller 600 processes the input image signals R, G, and B appropriately for an operation condition of the liquid crystal panels assembly 300 based on the input image signals Din and the input control signal ICON, to convert the same into an output image signal DAT and to generate an image scan control signal CONT1, an image data control signal CONT2, and a sensing data control signal CONT3. Next, the signal controller 600 transmits the image scan control signal CONT1 to the gate driver 400, the image data control signal CONT2 and the processed output image signal DAT to the image data driver 500, and the sensing data control signal CONT3 to the sensing signal processor 700.

The scan control signals CONT1 include a scanning start signal STV for instructing to start scanning and at least one clock signal for controlling the output period of the gate-on voltages Von to each of the gate lines. The image scan control signals CONT1 may further include an output enable signal OE for defining the duration of the gate-on voltage Von.

The data control signals CONT2 include a horizontal synchronization start signal STH for informing of transmission start of the data digital output image signal DAT for a row (or another group) of sub/pixels, a load signal LOAD for instructing to apply the analog data voltage to the image data lines $D_1$-$D_m$, and a data clock signal HCLK. The data control signal CONT2 may further include an inversion signal for inverting the polarity of the voltages of the data signals with respect to the common voltage Vcom (hereinafter "the polarity of the voltages of the data signals with respect to the common voltage" is abbreviated as "the polarity of the data signals").

In response to the data control signals CONT2 from the signal controller 600, the image data driver 500 receives digital image signals DAT for a row (or a group) of sub/pixels from the signal controller 600, converts the digital image signals DAT into analog data signals by selecting gray voltages corresponding to the respective digital image signals DAT, and applies the digital image signals DAT to the data lines $D_1$-$D_m$.

The gate driver 400 applies the gate-on voltage Von to the gate lines $G_1$-$G_{n+1}$ in response to the gate control signals CONT1 from the signal controller 600, so as to turn on the switching element Qp (FIG. 2) and the first transistor Qs (FIG. 3) connected thereto. Thereby, the image data signal applied to the image data lines $D_1$-$D_m$ are supplied to the pixels PX through the turned-on switching elements Qp, and the reset voltage Vr is momentarily applied to node N of the corresponding sensing unit SU through the first transistor Qs.

The difference between the voltage of the image data signals applied to the respective sub/pixels PX and the common voltage Vcom is expressed as a charged voltage stored on the liquid crystal capacitors Clc, i.e., pixel voltages. The arrangement of the liquid crystal molecules is changed depending on magnitude of the pixel voltage, thereby changing the polarization of light passing through the liquid crystal layer 3. The change of the polarization is converted into a change of light transmittance by action of the polarizer attached to the liquid crystal panels assembly 300, thereby displaying the desired images.

The above operation is repeatedly performed by a unit of a horizontal period 1H corresponding to one period of the horizontal synchronization signal Hsync and the data enable signal DE, such that the gate-on voltage Von is sequentially applied to all the gate lines $G_1$-$G_{n+1}$ and the image data voltage is applied to all the pixels, so as to display an image of one frame.

After one frame ends, a subsequent frame is started, and a state of the inversion signal RVS applied to the image data driver 500 to invert the polarity of the data voltage applied to each pixel PX from the polarity in a previous frame is controlled, which is referred to as a "frame inversion". In this case, in one frame, the polarity of the data voltage flowing through one data line may be periodically changed according to characteristics of the inversion signal RVS (e.g., row inversion and dot inversion), or the polarities of the data voltage applied to one pixel row may be different. (e.g., column inversion and dot inversion).

On the other hand, if the capacitance of the variable capacitor Cv is changed by the contact, then after the reset operation and if the change remains for the next row scan operation (Von applied again to $G_{i-1}$) and in response to the changed capacitance the magnitude of the voltage at the contact point N is changed. Here, the gate driver 400 applies the gate-on voltage Von to the previous gate line $G_{i-1}$ according to the image scan control signal CONT1 from the signal controller 600, the voltage applied to one terminal of the reference capacitor Cp is changed from the gate-off voltage Voff to the gate-on voltage Von. Thus, the voltage of the contact point node N is defined by the combination of the value of the capacitance of the variable capacitor Cv and the value of the gate-on voltage Von at that time. With appropriate setting of the source voltage, Vs, the gate to source voltage ($V_{GS}$) of the second transistor Qo indicates the state of the variable capacitor Cv. Accordingly, when potential is applied to the drain (Sk line) of the second transistor Qo, the second transistor Qo can conduct a drain-to-source current ($I_{DS}$) whose magnitude is a function of the voltage of the contact point N and of the voltage of the output terminal (Sk), and the current as the sensing signal is thus transmitted along the respective one Sk of the plural sensing data lines $S_1$-$S_o$.

Next, if the gate driver 400 applies the gate-on voltage Von to the gate line $G_i$ according to the image scan control signal CONT1 from the signal controller 600, the first transistor Qs is turned on, and the reset voltage Vr is applied to the contact point N and thereby the voltage of the contact point N is initialized to a state where Qo is turned off.

The sensing signal processor 700 reads the sensing data signal flowing through the sensing data lines $S_1$-$S_o$ according to the sensing data control signal CONT3. It is not necessary for the read operation to be executed every frame, and the read operation may be executed once per a predetermined plurality of frames.

Also, the sensing signal processor 700 signal-processes the read analog sensing signal such as amplifying and filtering it. Additionally, the sensing signal processor 700 performs an analog-to-digital conversion to thereby convert the filtered and amplified analog signal a digital detection signal DSN, and outputs the latter to the contact determining unit 800.

The contact determining unit 800 receives the digital detection signal DSN and appropriately processes it to determine existence of a touch and a touch position and optionally a touch strength and transmit these indications to the external device, and the external device transmits responsive image signals R, G, and B based thereon to the liquid crystal display.

Next, the liquid crystal display will be described with reference to FIG. 4 to FIG. 7.

Figure 4:
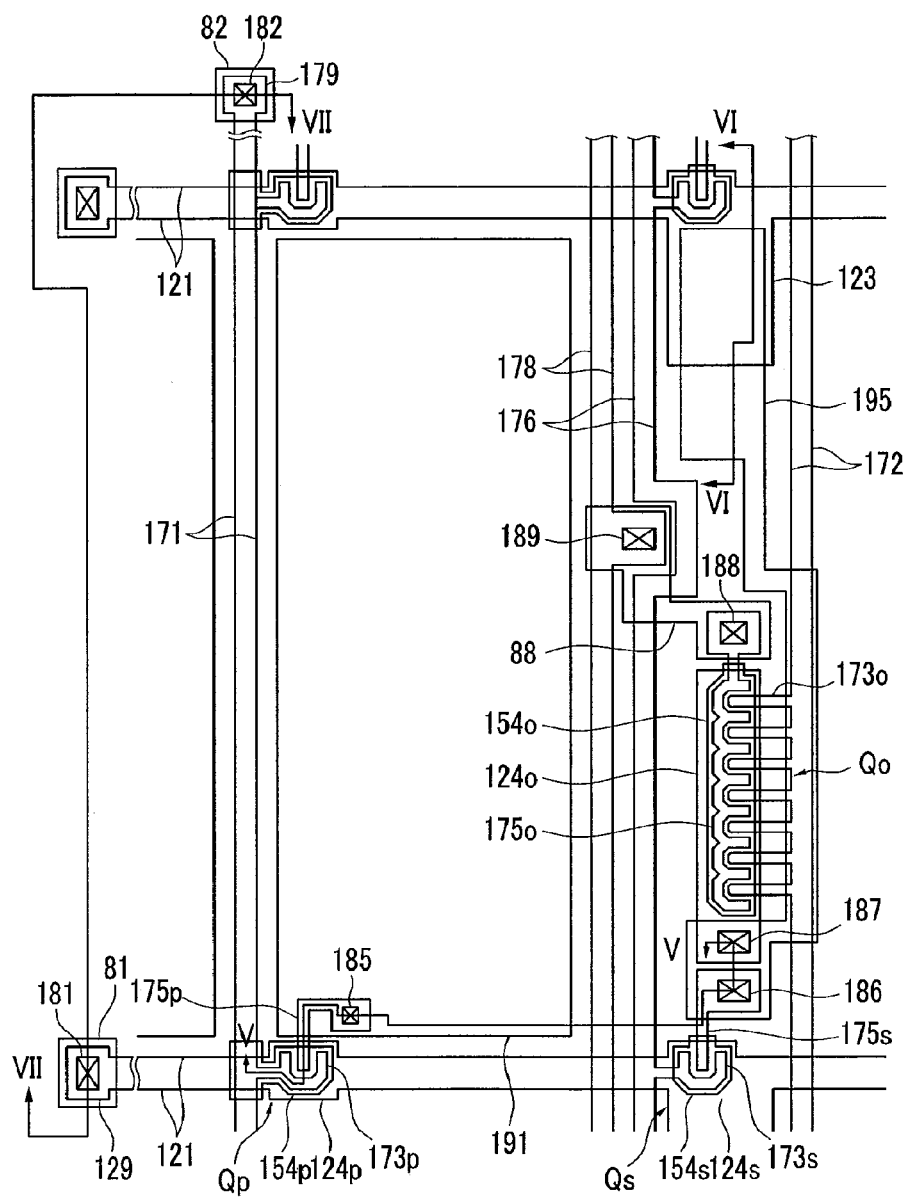
FIG. 4 is a layout view showing a sub/pixel unit and a sensing unit in a liquid crystal display according to an exemplary embodiment.
Figure 5:
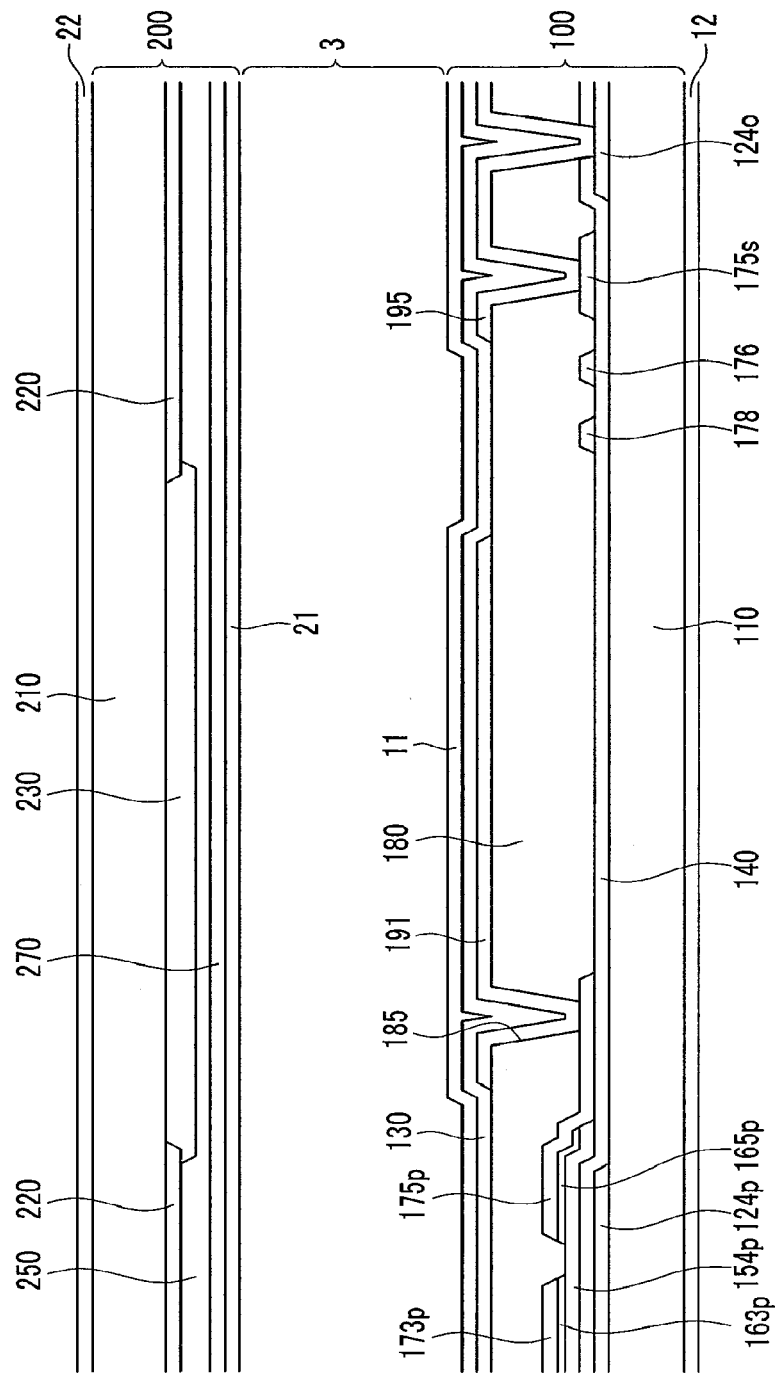
FIG. 5, FIG. 6, and FIG. 7 are cross-sectional views of the liquid crystal display shown in FIG. 4 taken along the lines V-V, VI-VI, and VII-VII.
Figure 6:
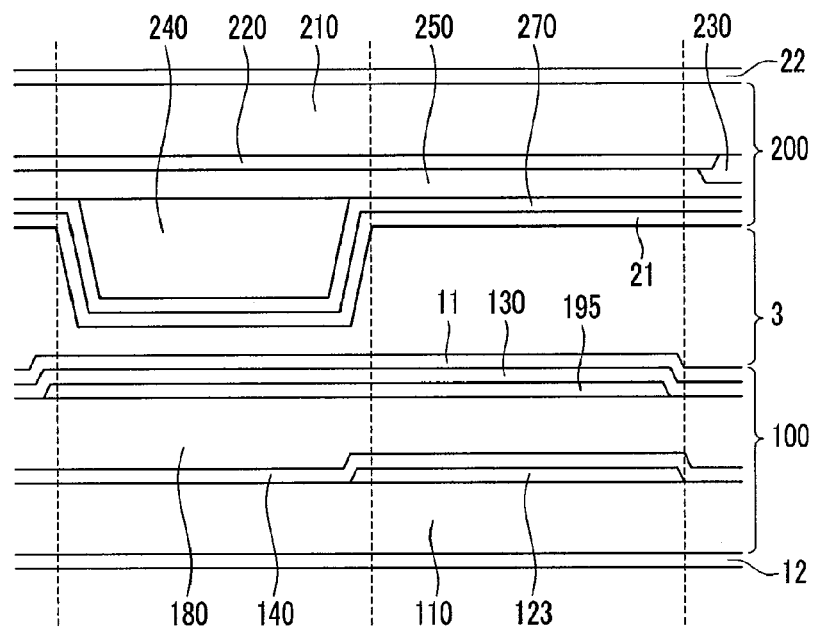
Figure 7:
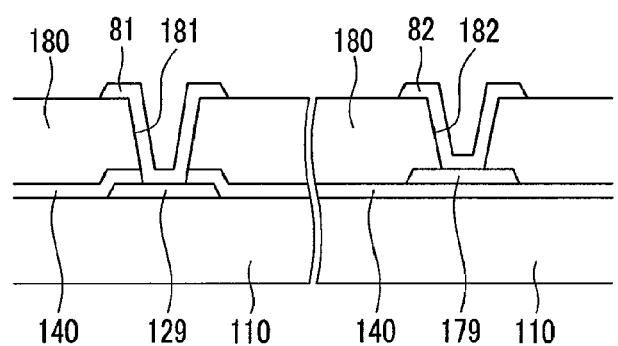

FIG. 4 is a layout view showing a pixel and a sensing unit in a liquid crystal display according to an exemplary embodiment, and FIG. 5, FIG. 6, and FIG. 7 are cross-sectional views of the liquid crystal display shown in FIG. 4 taken along the lines V-V, VI-VI, and VII-VII.

Referring to FIG. 4 to FIG. 7, a liquid crystal display according to the present exemplary embodiment includes a lower panel 100 and an upper panel 200 facing to each other, a liquid crystal layer 3 interposed between two display panels 100 and 200, and a pair of polarizers 12 and 22 respectively attached on the outer surfaces of the display panels 100 and 200.

Firstly, the lower panel 100 will be described.

A plurality of gate lines 121 and a first electrode member 124o are formed on an insulation substrate 110 made of transparent glass or plastic.

The gate lines 121 transmit gate signals and extend in a transverse direction. Each of gate lines 121 includes a first gate electrode 124p, a second gate electrode 124s, and a reference electrode 123 extending upward and downward, and an end portion 129 for the connection with an another layer or an external driving circuit. Another electrode member 124o forms a third gate electrode 124o associated with the sensing transistor Qo. A gate insulating layer 140 preferably made of a silicon nitride (SiNx) or a silicon oxide (SiOx) is formed on the gate lines 121, 124s, and 124p, and the third gate electrode 124o.

A first semiconductor island 154p, a second semiconductor island 154s, and a third semiconductor island 154o made of hydrogenated amorphous silicon (abbreviated to "a-Si") or polysilicon (polycrystalline silicon) are formed on a gate insulating layer 140. The first to third semiconductors 154p, 154s, and 154o are respectively disposed on the first to third gate electrodes 124p, 124s, and 124o.

First ohmic contact islands 163p and 165p (FIG. 5), second ohmic contact islands (not shown), and third ohmic contact islands (not shown) are respectively formed on the semiconductors 154p, 154s, and 154o.

A data conductor including a plurality of image data lines 171, sensing data lines 172, a reset voltage line 176, a driving voltage line 178, and first, second, and third drain electrodes 175p, 175s, and 175o are formed on the ohmic contacts 163p and 165p and the gate insulating layer 140.

Each of image data lines 171 includes a first source electrode 173p and an end portion 179 having a wide area for connection with another layer or an external driving circuit. The reset voltage line 176 includes a second source electrode 173s, and the sensing data line 172 includes a third source electrode 173o.

The first/second/third gate electrode 124p/124s/124o, the first/second/third source electrode 173p/173s/173o, and the first/second/third drain electrode 175p/175s/175o respectively form the first/second/third thin film transistors (TFTs) Qp/Qs/Qo along with the first/second/third semiconductor islands 154p/154s/154o, and the channels of the thin film transistor are formed in the semiconductor 154p/154s/154o between the source electrodes 173p/173s/173s and the drain electrodes 175p/175s/175o respectively.

A passivation layer 180 is formed on data conductors 171, 172, 176, 178, 175p, 175s, and 175o and the exposed portion of the semiconductors 154p, 154s, and 154o. The passivation layer 180 may be made of an inorganic insulator or an organic insulator and may have a flat surface. Examples of the inorganic insulator may be a silicon nitride and a silicon oxide. The organic insulator may have photosensitivity, and the dielectric constant thereof may be less than 4.0.

The passivation layer 180 has a plurality of contact holes 185, 186, 187, 188, and 189 respectively exposing the end portion 170 of the image data line 171, the first drain electrode 175p, the second drain electrode 175s, the third drain electrode 175o, the driving voltage line 178, and the passivation layer 180, and the gate insulating layer 140 has a plurality of contact holes 181 and 182 respectively exposing the end portion 129 of the gate line 121 and the third gate electrode 124o.

A pixel electrode 191, a sensing electrode 195, a plurality of contact assistants 81 and 82, and a connecting member 88 are formed on the passivation layer 180.

The pixel electrode 191 is physically and electrically connected to the first drain electrode 175p through the contact hole 185 and receives the data voltage from the first drain electrode 175p. The pixel electrode 191 is supplied with the data voltage to thereby generate an electric field together with the common electrode 270 of the upper panel 200 that receives the common voltage, and to thereby determine a direction of liquid crystal molecules (not shown) of the liquid crystal layer 3 between the two electrodes 191 and 270. Polarization of light that transmits through the liquid crystal layer 3 differs depending on the thusly-determined direction of the liquid crystal molecules. The pixel electrode 191 and the common electrode 270 form the liquid crystal capacitor to maintain the applied voltage even after the TFT is turned off A portion of the sensing electrode 195 overlaps the reference electrode 123, and extends downward to be physically and electrically connected to the second drain electrode 175s and the third gate electrode 124o through the contact holes 186 and 187. The sensing electrode 195 forms the variable capacitor Cv along with the common electrode 270 disposed on a protrusion 240 of the upper panel 200. Here, the liquid crystal layer 3 disposed between the electrodes 195 and 270 functions as the dielectric material (referring to FIG. 6). The variable capacitor Cv accumulates the charges from the common voltage Vcom applied to the common electrode 270 to transmit them to the third gate electrode 124o as a control voltage. Also, the sensing electrode 195 forms the reference capacitor Cp along with the reference electrode 123. Here, the gate insulating layer 140 and the passivation layer 180 between the sensing electrode 195 and the reference electrode 123 function as the dielectric material (referring to FIG. 6).

The sensing electrode 195 and the third gate electrode 124o connected thereto through the contact hole 187 are electrically isolated from the outside.

The contact assistants 81 and 82 are connected to the end portions 129 of the gate lines 121 and the end portions 179 of the data lines 171 through the contact holes 181 and 182, respectively. The contact assistants 81 and 82 function to enhance the adhesiveness between the end portions 129 of the gate lines 121 and the end portions 179 of the image data lines 171 and an external apparatus, and also to protect them.

The connecting member 88 connects the driving voltage line 178 (Vs) and the third drain electrode 175o through the contact holes 188 and 189.

Referring to FIG. 5, an insulating layer 130 is formed on the pixel electrode 191, the sensing electrode 195, the contact assistants 81 and 82, the connecting member 88, and the passivation layer 180. An alignment layer 11 is formed on the insulating layer 130.

Next, the upper panel 200 will be described.

A light blocking member 220 is formed on an insulating substrate 210. The light blocking member 220 is referred to as a black matrix, and prevents light leakage.

A plurality of color filters 230 are formed on the substrate 210. The color filters 230 are mostly located in a region surrounded by the light blocking member 220, and may extend in a longitudinal direction along a column of the pixel electrodes 191. Each color filter 230 may represent one of three primary colors, such as red, green, and blue.

A light-passing overcoat 250 is formed on the color filters 230 and the light blocking member 220. Overcoat 250 may provide a planarizing function.

A plurality of protrusions 240 made of an organic material are formed on the overcoat 250. The protrusions 240 are disposed corresponding to the positions of the sensing electrodes 195 of the thin film transistor array panel 100, and reduce the distance between the sensing electrode 195 and the common electrode 270 to thereby increase the capacitance of the variable capacitor Cv. The organic layer may be coated and patterned with a desired height to form the protrusions 240.

A common electrode 270 preferably made of a transparent conductive material such as ITO or IZO is formed on the overcoat 250 and the protrusions 240. On the other hand, a transparent conductive material such as ITO or IZO may be firstly deposited on the overcoat 250, and then the protrusions 240 may be formed, and then the transparent conductive material such as ITO or IZO with the thickness of 10-300 nm thickness may again be deposited to form the common electrode 270.

An alignment layer 21 is formed on the common electrode 270. The alignment layer 21 may function to align molecules of the liquid crystal material 3.

As above-described, the sensing electrode 195 forms the node N part of the variable capacitor Cv and this is opposed by the common electrode 270 disposed on the protrusions 240 of the upper panel 200. The capacitance of the variable capacitor Cv is changed by varying the distance between the sensing electrode 195 and the common electrode 270 by means of an external force contact. If the sensing electrode 195 and the common electrode 270 that are the terminals of the variable capacitor Cv are shorted to each other, the capacitance of the variable capacitor Cv appears to be infinite such that the sensing function of the sensing unit SU is not normally operated. Accordingly, although the external pressure is applied, the distance between the sensing electrode 195 and the common electrode must be uniformly maintained for the sensing electrode 195 and the common electrode 270 to not be shorted. On the other hand, the alignment layers 11 and 21 are formed between the sensing electrode 195 and the common electrode 270, but it is difficult for the alignment layers 11 and 21 to sufficiently prevent the short between the sensing electrode 195 and the common electrode 270.

However, in an exemplary embodiment, the insulating layer 130 is disposed on the sensing electrode 195 such that it is difficult for the sensing electrode 195 and the common electrode 270 to be shorted together, and thereby relatively reducing the distance between the sensing electrode 195 and the common electrode 270. Comparing the short distance between the sensing electrode 195 and the common electrode 270 with the long distance, when the distance between the sensing electrode 195 and the common electrode 270 is equally changed by the external pressure, the change of the capacitance of the variable capacitor Cv is larger in the short distance between the sensing electrode 195 and the common electrode 270 than that in the long distance. Accordingly, the control voltage of the second transistor Qo is larger in the case of the shortening of distance between the sensing electrode 195 and the common electrode 270 compared with the case of the elongating of separation distance between the sensing electrode 195 and the common electrode 270, and thereby change in the current flowing through the second transistor Qo is more increased by shortening the gap of Cv such that the sensing signal will be changed. Accordingly, the sensing function of the sensing unit SU is more effective in the pressing down direction.

Here, the insulating layer 130 may only be formed in the sensing portion. Among the sensing portion, the insulating layer 130 may only be formed on the portions corresponding to the protrusions.

Next, a liquid crystal display according to another exemplary embodiment of the present invention will be described with reference to FIG. 8.

Figure 8:
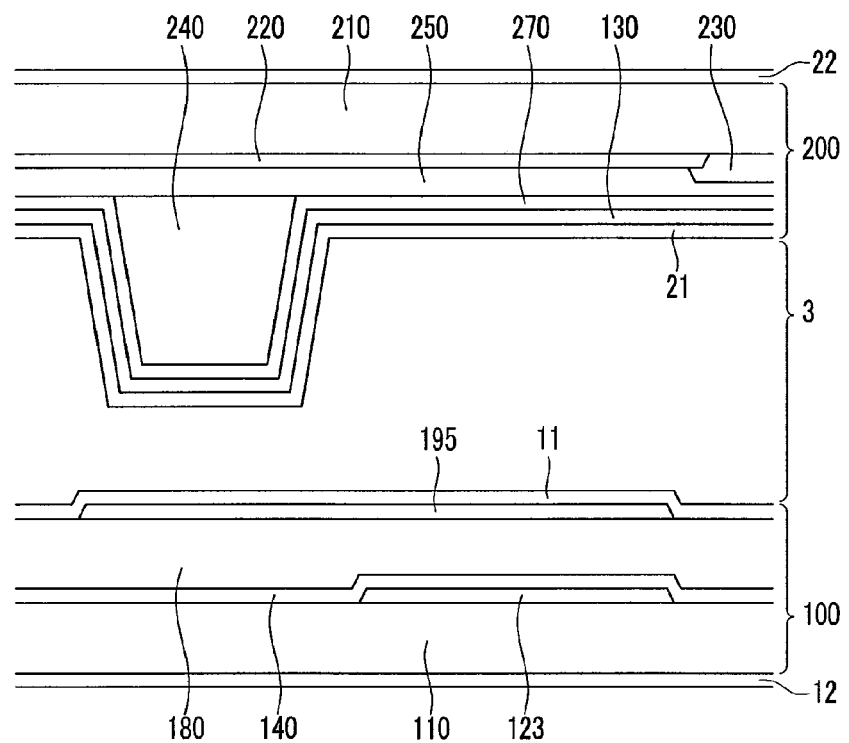
FIG. 8 is a cross-sectional view showing another example of the liquid crystal display shown in FIG. 3 and FIG. 4.

FIG. 8 is a cross-sectional view showing another example of the liquid crystal display shown in FIG. 3 and FIG. 4.

Referring to FIG. 8, a liquid crystal display according to another exemplary embodiment includes a lower panel 100 and an upper panel 200 facing each other, a liquid crystal layer 3 interposed between the display panels 100 and 200, and a pair of polarizers 12 and 22 attached on the outer surface of the display panels 100 and 200.

The lower panel 100 includes a substrate 110, and a reference electrode 123, a gate insulating layer 140, a passivation layer 180, a sensing electrode 195, and an alignment layer 11 that are sequentially formed. The upper panel 200 includes a light blocking member 220 formed on a substrate 210, a color filter 230 formed within the light blocking member 220, an overcoat 250 formed on the light blocking member 220 and the color filter 230, and a protrusion 240, a common electrode 270, an insulating layer 130, and an alignment layer 21 that are sequentially formed on the overcoat 250.

In the liquid crystal display of FIG. 8, differently from the liquid crystal display shown in FIG. 6, the insulating layer 130 is not formed in the lower panel 100, but is formed in the upper panel 200. Thus, like the exemplary embodiment of FIG. 6, it is impossible for the sensing electrode 195 and the common electrode 270 to be shorted to each other. Accordingly, the distance between the sensing electrode 195 and the common electrode 270 may be reduced.

Next, a liquid crystal display according to another exemplary embodiment will be described with reference to FIG. 9 to FIG. 11.

Figure 9:
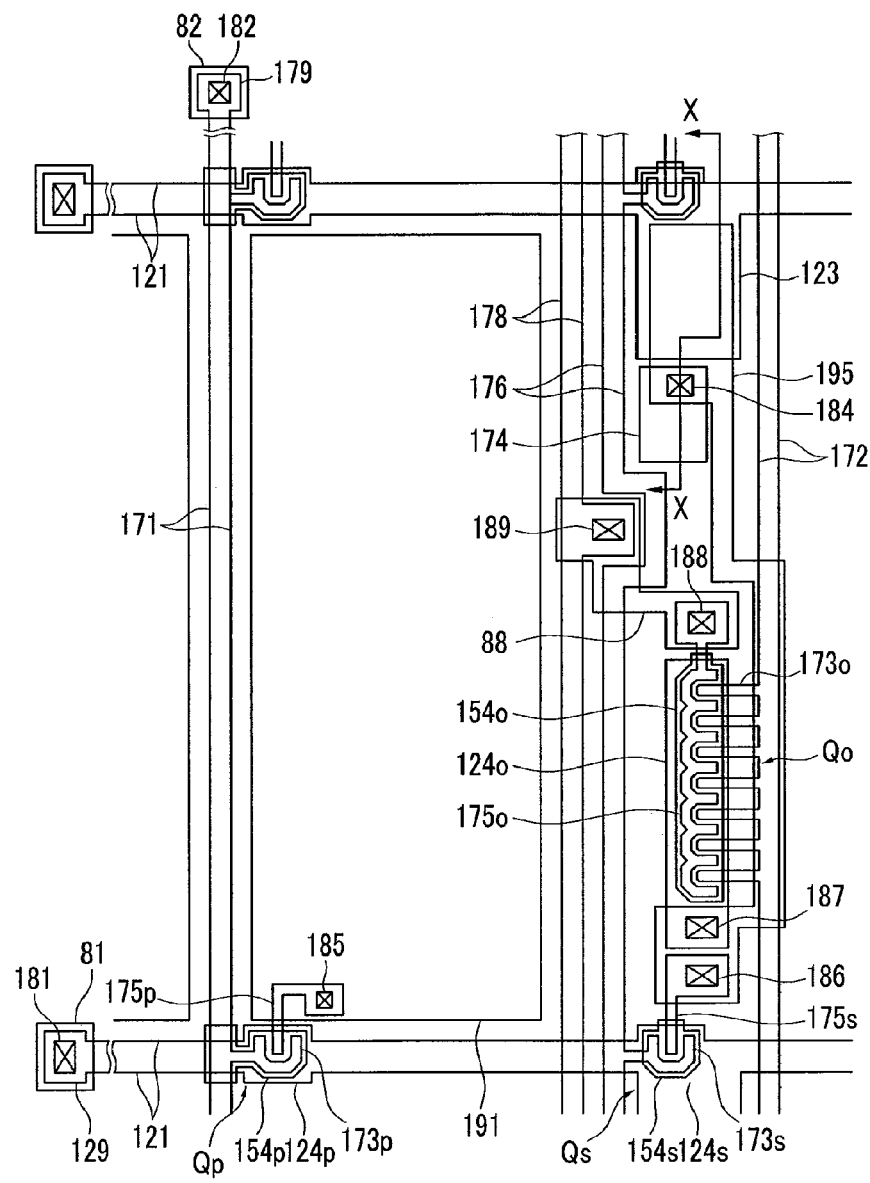
FIG. 9 is a layout view of a sub/pixel unit (PX) and a sensing unit (SU) in a liquid crystal display according to another exemplary embodiment.
Figure 10:
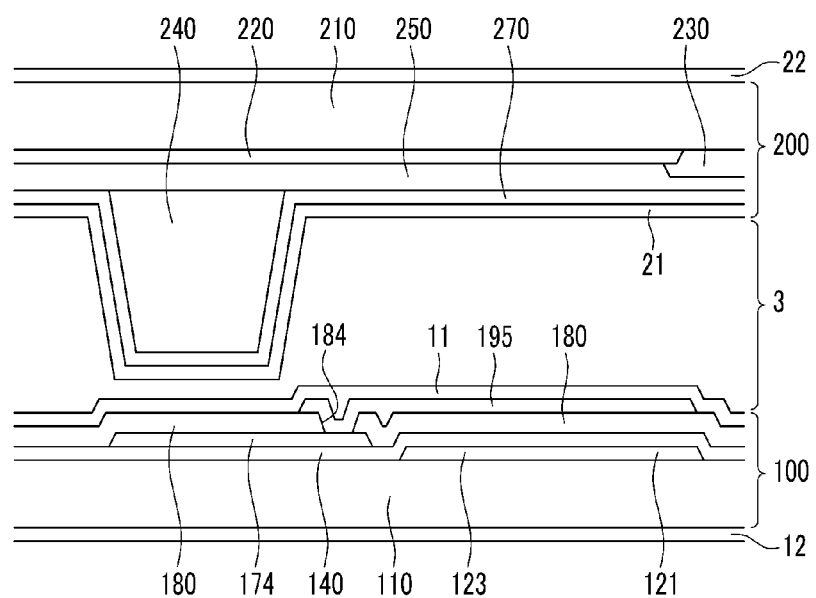
FIG. 10 is a cross-sectional view of the liquid crystal display shown in FIG. 9 taken along the line X-X.
Figure 11:
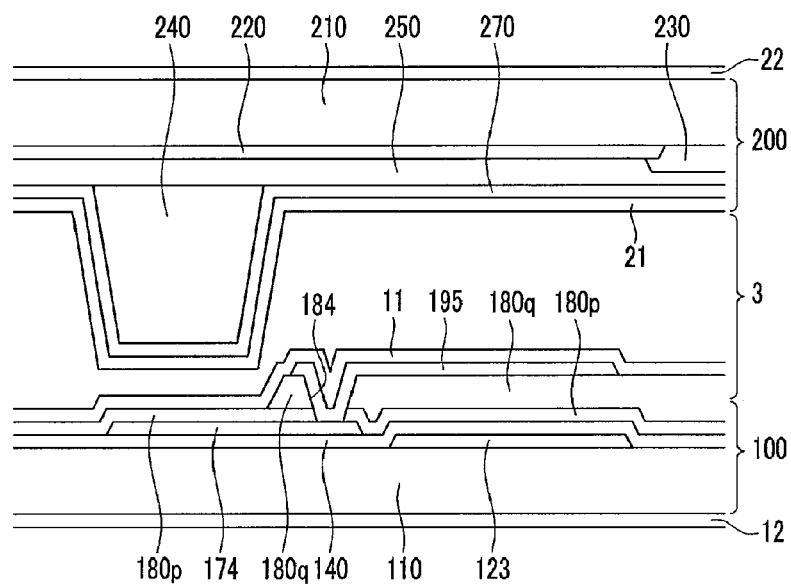
FIG. 11 is another cross-sectional view of the liquid crystal display shown in FIG. 9 taken along the line X-X.

FIG. 9 is a layout view of a pixel and a sensing unit in a liquid crystal display according to another exemplary embodiment of the present disclosure, FIG. 10 is a cross-sectional view of the liquid crystal display shown in FIG. 9 taken along the line X-X, and FIG. 11 is another cross-sectional view of the liquid crystal display shown in FIG. 9 taken along the line X-X.

Referring to FIG. 9, in the liquid crystal display according to the present exemplary embodiment, like in FIG. 4, gate conductors 121 and 124o are formed on a substrate 110, a gate insulating layer 140 is formed on the gate conductors 121 and 124o, semiconductors 154p, 154s, and 154o are formed on the gate insulating layer 140, ohmic contacts (not shown) are formed on the semiconductors 154p, 154s, and 154o, a data conductor including an image data line 171, a sensing data line 172, a reset voltage line 176, a driving voltage line 178, the first, second, and third drain electrodes 175p, 175s, and 175o are formed thereof, and a passivation layer 180 is formed on the data conductors 171, 172, 176, 178, 175p, 175s, and 175o and the exposed semiconductors 154p, 154s, and 54o. The passivation layer 180 has contact holes 182, 185, 186, 188, and 189, and the passivation layer 180 and the gate insulating layer 140 have contact holes 181 and 187. A pixel electrode 191, a sensing electrode 195, a plurality of contact assistants 81 and 82, and a connecting member 88 are formed on the passivation layer 180.

In the upper panel 200, like the liquid crystal display of FIG. 4, a light blocking member 220, a color filter 230, an overcoat 250, protrusions 240, and a common electrode 270 are formed on the substrate 210.

However, in the liquid crystal display shown in FIG. 9, differently from the liquid crystal display of FIG. 4, the passivation layer 180 on the portion where the protrusion 240 is formed is not covered by the sensing electrode 195. Also, a second electrode member 174 of the data conductor is overlapped by the protrusion 240. In the liquid crystal display of FIG. 9, the variable capacitor Cv includes the second electrode member 174 and the common electrode 270 as its two terminals, and the liquid crystal layer 3 and the passivation layer 180 between the two terminals functions as a dielectric material.

The passivation layer 180 has a contact hole 184 exposing the second electrode member 174. The second electrode member 174 is physically and electrically connected to the sensing electrode 195 through the contact hole 184.

Also, in the liquid crystal display shown in FIG. 9, the insulating layer 130 does not exist, differently from the liquid crystal display shown in FIG. 4.

In the liquid crystal display of FIG. 9, the passivation layer 180 disposed between the common electrode 270 and the second electrode member 174 forming two terminals of the variable capacitor Cv as well as the alignment layers 11 and 21 ensure that the shorting between the common electrode 270 and the second electrode member 174 may be prevented without the insulating layer. The second electrode member 174 is connected to the sensing electrode 195 such that the voltage of the third gate electrode 124o may be changed according to the change of the capacitance of the variable capacitor Cv.

Next, a liquid crystal display according to another exemplary embodiment of the present disclosure will be described with reference to FIG. 11.

Referring to FIG. 11, in a liquid crystal display according to the present exemplary embodiment, differently from FIG. 9, the passivation layer 180 includes a lower layer 180p made of an inorganic insulator such as a silicon nitride or a silicon oxide, and an upper layer 180q made of an organic insulator. Here, the upper layer 180q does not exist and the lower layer 180p is exposed in the portion where the protrusion 240 exists. Accordingly, in the case of FIG. 11 the lower layer 180q made of the inorganic insulator is also disposed between the common electrode 270 and the second electrode member 174 forming two terminals of the variable capacitor Cv such that the common electrode 270 and the second electrode member 174 are not shorted together.

On the other hand, the upper layer 180q may be the color filter 230, and the upper panel 200 does not include a separate color filter 230 in this case.

In the exemplary embodiment, the second electrode member 174 of the data conductor overlaps the protrusion 240, however the gate conductor may be formed on the portion overlapping the protrusion 240. In this case, the passivation layer on the gate conductor may be all removed or may be thinly maintained.

Next, a liquid crystal display according to another exemplary embodiment of the present disclosure will be described with reference to FIG. 12 and FIG. 13.

Figure 12:
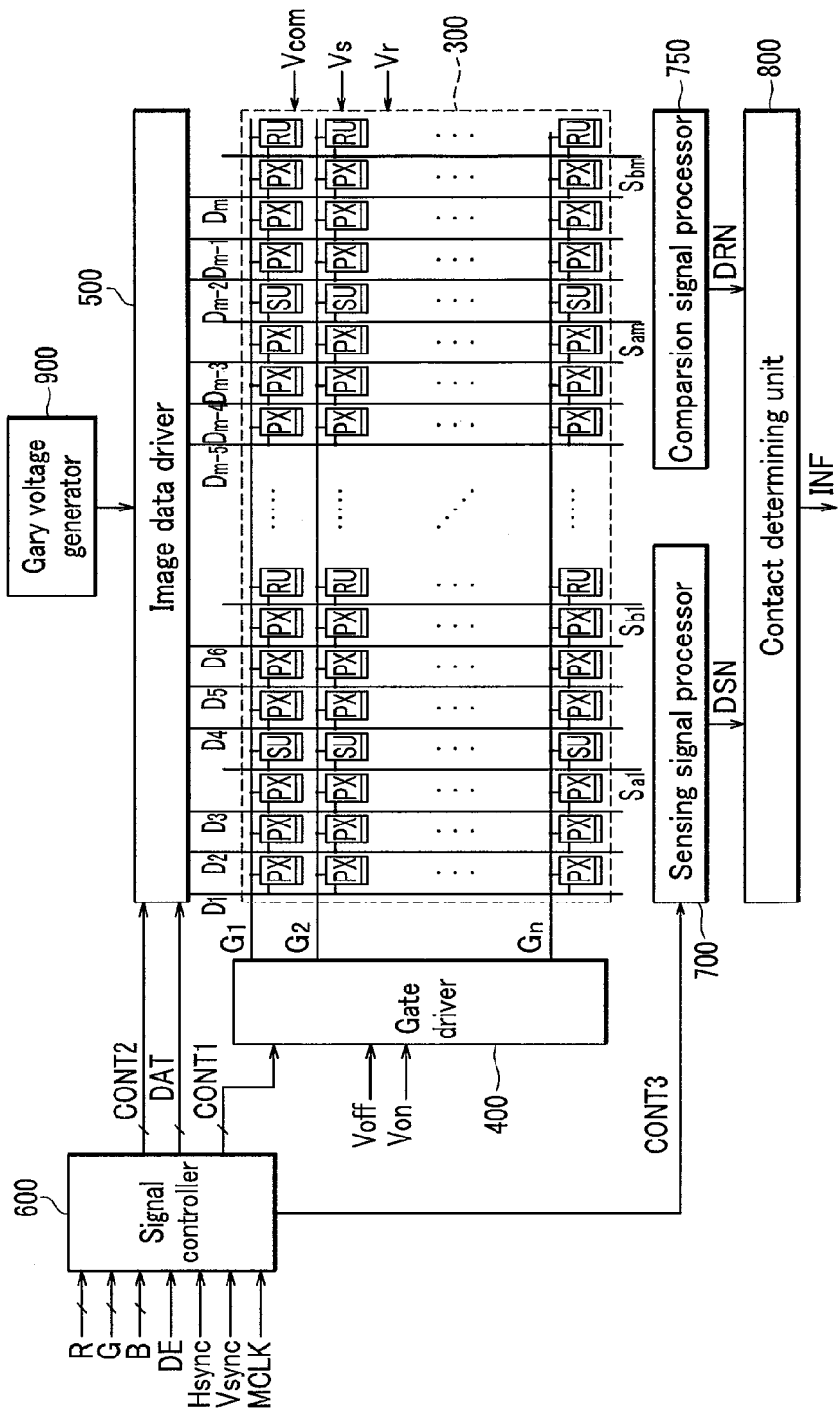
FIG. 12 is a block diagram of a liquid crystal display according to another exemplary embodiment.

FIG. 12 is a block diagram of a liquid crystal display according to another exemplary embodiment.

Referring to FIG. 12, a liquid crystal display according to the present exemplary embodiment includes a liquid crystal panels assembly 300, a gate driver 400, a data driver 500, a sensing signal processor 700, a contact determining unit 800, a gray voltage generator 900, and a signal controller 600, like the liquid crystal display of FIG. 1. Also, the liquid crystal display of FIG. 12 includes a plurality of signal lines $G_1$-$G_{n+1}$, $D_1$-$D_m$, and $S_{a1}$-$S_{am}$, and a plurality of sub/pixels PX and a plurality of sensing units SU connected thereto and arranged substantially in a matrix.

Differently from the liquid crystal display of FIG. 1, the liquid crystal display shown in FIG. 12 includes a plurality of signal lines $G_1$-$G_{n+1}$, $D_1$-$D_m$, and $S_{b1}$-$S_{bm}$, and a comparison signal generator unit RU connected thereto. The sensing unit SU is connected to the sensing data lines $S_{a1}$-$S_{am}$, and the comparison signal generator RU is connected to the reference data lines $S_{b1}$-$S_{bm}$. The sensing unit SU and the comparison signal generator RU may be alternately arranged and may be individually disposed for one dot including three neighboring subpixels PX in the row direction. The sensing unit SU of the present exemplary embodiment is the same as the sensing unit shown in FIG. 3. Also, the comparison signal generator may be positioned near the sensing unit.

Further, the liquid crystal display of FIG. 12 additionally includes a comparison signal processor 750. The comparison signal processor 750 is connected to the reference data lines $S_{b1}$-$S_{bm}$ of the liquid crystal panels assembly 300, and receives the reference data signal output through the reference data lines $S_{b1}$-$S_{bm}$ to process the signal processes such as by amplifying and filtering, and an analog-digital converter (not shown) converts to generate the digital comparison signal DRN. On the other hand, the sensing signal processor 700 is connected to the sensing data lines $S_{a1}$-$S_{am}$ of the liquid crystal panels assembly 300.

Next, the comparison signal generator RU of the liquid crystal display according to the present exemplary embodiment will be described with reference to FIG. 13.

Figure 13:
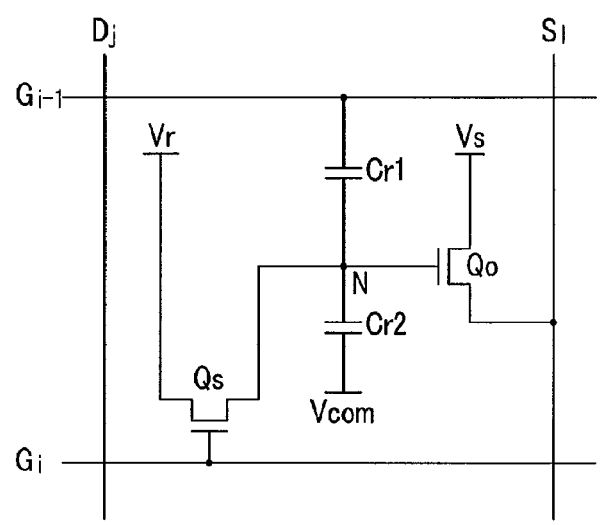
FIG. 13 is an equivalent circuit diagram of a comparison signal generator of a liquid crystal display according to another exemplary embodiment.

FIG. 13 is an equivalent circuit diagram of a comparison signal generator in a liquid crystal display according to another exemplary embodiment of the present invention.

Referring to FIG. 13, each comparison signal generator RU includes a first comparison capacitor Cr1, a second comparison capacitor Cr2, a first transistor Qs, and a second transistor Qo.

One end of the second comparison capacitor Cr2 is connected to the first comparison capacitor Cr1 and the first and second transistors Qs and Qo at the contact point N, and the other end thereof is connected to the common voltage Vcom.

One end of the first comparison capacitor Cr1 is connected to the second comparison capacitor Cr2 and the first and second transistors Qs and Qo at the contact point N, and the other end thereof is connected to the previous gate line $G_{i-1}$.

The output terminal of the second transistor Qo is connected to the reference data line S1, and the remaining description of the first transistor Qs and the second transistor Qo is the same as that of FIG. 3.

Next, an operation of the liquid crystal display will be described in detail.

In the liquid crystal display according to the present exemplary embodiment, the operation of the sensing unit SU is the same as the above description such that the description thereof is omitted.

When the capacitance of the variable capacitor Cv included in the neighboring sensing units SU is changed by the external contact, the comparison signal generator RU is not influenced by the external contact such that the capacitance of the second comparison capacitor Cr2 is not changed. Here, if the gate driver 400 applies the gate-on voltage Von to the previous gate line $G_{i-1}$ according to the image scan control signal CONT1 from the signal controller 600, the voltage of one terminal of the first comparison capacitor Cr1 is changed from the gate-off voltage Voff to the gate-on voltage Von. Thus, the voltage of the contact point N is changed by the difference between the gate-off voltage Voff and the gate-on voltage Von. Further, the second transistor Qo of the comparison signal generator RU flows the current according to the difference between the voltage of the contact point N and the output terminal, and the current is applied to the reference data line $S_{b1}$-$S_{bm}$ as the reference data signal. This reference data signal that is different from the sensing data signal is generated from the sensing unit SU and is not generated by the change of the voltage of the contact point N, but is the current according to the difference between the voltage of the contact point N and the output voltage of the second transistor Qo based on the basic characteristics of the second transistor Qo regardless of external contact.

Next, if the gate driver 400 applies the gate-on voltage Von to the gate line $G_i$ according to the image scan control signal CONT1 from the signal controller 600, the first transistor Qs is turned on and the reset voltage Vr is applied to the contact point N, and thereby the voltage of the contact point N is initialized.

The comparison signal processor 750 reads the reference data signal flowing through the reference data line $S_{b1}$-$S_{bm}$ according to the sensing data control signal CONT3. It is not necessary for the read operation to be executed every frame, and the read operation may be executed once every predetermined number of plural frames.

Next, the comparison signal processor 750 signal-processes the read analog sensing reference data signal such as amplifying and filtering to convert it into a digital comparison signal DRN, and outputs it to the contact determining unit 800.

The contact determining unit 800 receives the digital comparison signal DRN and the digital detection signal DSN to compare the difference therebetween to thereby determine existence of a touch and a touch position and transmits it to the external device, and the external device transmits the image signal R, G, and B based thereon to the liquid crystal display.

It may be difficult to manufacture the semiconductor included in the transistor to have essentially same uniform characteristics across the entire display device under the manufacturing process of the transistors Qs and Qo such that the characteristics such as the transistor threshold voltage may be different for every transistor included in the display device. Particularly, if the characteristics of the second transistor Qo may be sufficiently different for one or more among the second transistors Qo, that the sensing signal output from the sensing unit SU may also be different for one or more among the sensing units SU of the display screen taken as a whole. As a result, the sensing data signal may be out of the value range determined for the contact to be generated such that the existence determination of the touch (or not) and the touch position are incorrect.

The liquid crystal display according to the present exemplary embodiment does not determine the existence of a touch and a touch position based only on the sensing signal output from the sensing unit SU, but the reference sensing signal output from the adjacent sensing unit SU and the comparison data signal output from the comparison signal generator RU are compared to determine the existence of a touch and a touch position such that that an error of the contact determination being generated by the characteristic of the second transistor Qo may be prevented.

Next, various examples of the liquid crystal display according to FIG. 12 and FIG. 13 will be described with reference to FIG. 14 to FIG. 16.

Figure 14:
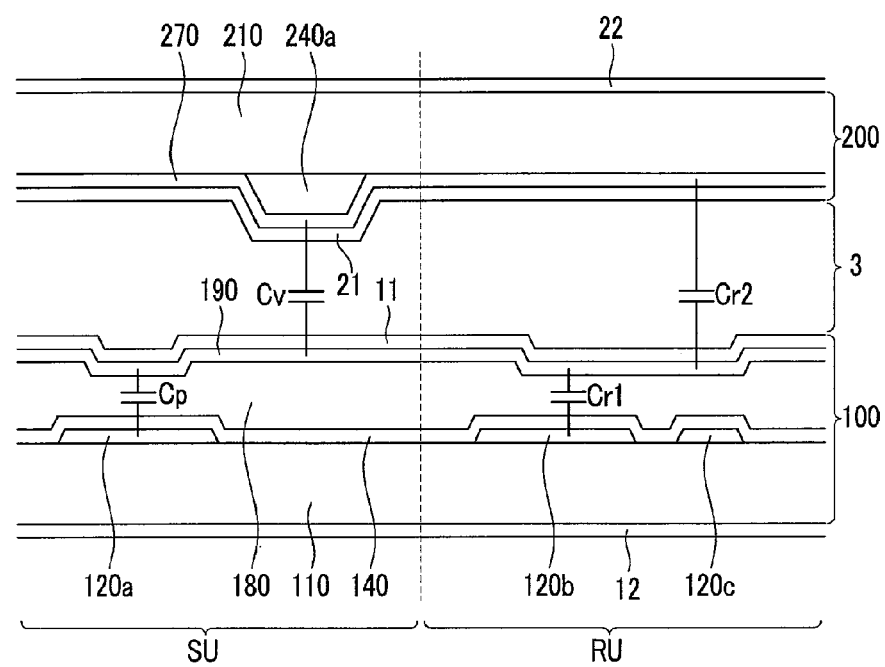
FIG. 14 is a cross-sectional view of an example of a sensing unit and a comparison signal generator of the liquid crystal display shown in FIG. 12 and FIG. 13.

FIG. 14 is a cross-sectional view showing one example of the sensing unit and the comparison signal generator of the liquid crystal display shown in FIG. 12 and FIG. 13.

Referring to FIG. 14, a liquid crystal display according to the present exemplary embodiment includes a lower panel 100 and an upper panel 200 facing each other, a liquid crystal layer 3 interposed between two display panels 100 and 200, and a pair of polarizers 12 and 22 respectively attached to the outer surfaces of the display panels 100 and 200, and also includes a sensing unit SU and a comparison signal generator RU.

Regarding the sensing unit SU, a first reference electrode 120a, a gate insulating layer 140, a sensing electrode 190, and an alignment layer 11 are sequentially formed on a lower substrate 110, and a first protrusion 240a, a common electrode 270, and an alignment layer 21 are sequentially formed on an upper substrate 210. The sensing electrode 190 forms a reference capacitor Cp along with the first reference electrode 120a, and the gate insulating layer 140 and the passivation layer 180 between the sensing electrode 190 and the first reference electrode 120a functions as the dielectric material. The sensing electrode 190 forms a variable capacitor Cv along the common electrode 270 disposed on the first protrusion 240a of the upper panel 200.

Regarding the comparison signal generator RU, second and third reference electrodes 120b and 120c, the gate insulating layer 140, the sensing electrode 190, and the alignment layer 11 are sequentially formed on the lower substrate 110, and the common electrode 270 and the alignment layer 21 are sequentially formed on the upper substrate 210. The sensing electrode 190 forms the first comparison capacitor Cr1 along with the second reference electrode 120b, and the gate insulating layer 140 and the passivation layer 180 between the sensing electrode 190 and the second reference electrode 120b function as the dielectric material. The sensing electrode 190 forms the second comparison capacitor Cr2 along with a nonprotruded portion of the common electrode 270 of the upper panel 200. Since the liquid crystal display of FIG. 14 omits the protrusion of the upper substrate 210 in the comparison signal generator such that the capacitance of the second comparison capacitor Cr2 is substantially reduced relative to Cv and change in the second comparison capacitor Cr2 is thus substantially minimized when the external contact is applied.

Next, another example of the liquid crystal display shown in FIG. 12 and FIG. 13 will be described with reference to FIG. 15.

Figure 15:
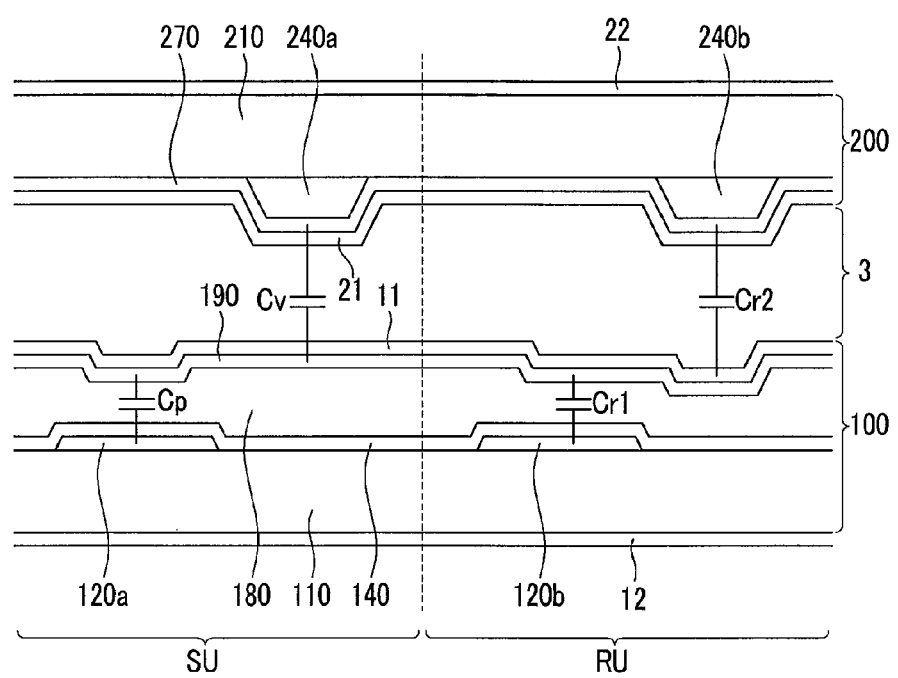
FIG. 15 is a cross-sectional view of another example of a sensing unit and a comparison signal generator of the liquid crystal display shown in FIG. 12 and FIG. 13.

FIG. 15 is a cross-sectional view showing another example of the sensing unit and the comparison signal generator of the liquid crystal display shown in FIG. 12 and FIG. 13.

Referring to FIG. 15, a liquid crystal display according to the present exemplary embodiment includes a lower panel 100 and an upper panel 200 facing each other, a liquid crystal layer 3 interposed between the display panels 100 and 200, and a pair of polarizers 12 and 22 respectively attached on the outer surfaces of the display panels 100 and 200, and also includes a sensing unit SU and a comparison signal generator RU.

The sensing unit SU is the same as that of the liquid crystal display of FIG. 14 such that the description thereof is omitted.

Regarding the comparison signal generator RU, the second reference electrode 120b, a gate insulating layer 140, a sensing electrode 190, and an alignment layer 11 are sequentially formed on a lower substrate 110, and the second protrusion 240b, a common electrode 270, and an alignment layer 21 are sequentially formed on an upper substrate 210. The sensing electrode 190 forms the first comparison capacitor Cr1 along with the second reference electrode 120b, and the second comparison capacitor Cr2 along with the common electrode 270 disposed on the second protrusion 240b of the upper panel 200. In the liquid crystal display of FIG. 15, the protrusions 240a and 240b are substantially identically disposed in the comparison signal generator RU and the sensing unit SU such that, in so far as the upper substrate 200 is concerned, the structure of the second comparison capacitor Cr2 of the comparison signal generator RU may be maximally the same as the structure of the variable capacitor Cv of the sensing unit SU. However, as seen in FIG. 15, the gap distance of the second comparison capacitor Cr2 is nonetheless substantially greater than that of the variable capacitor Cv. Accordingly, the capacitance of Cr2 changes much less than the capacitance of Cv when a contact is made.

Next, another example of the liquid crystal display shown in FIG. 12 and FIG. 13 will be described with reference to 16.

Figure 16:
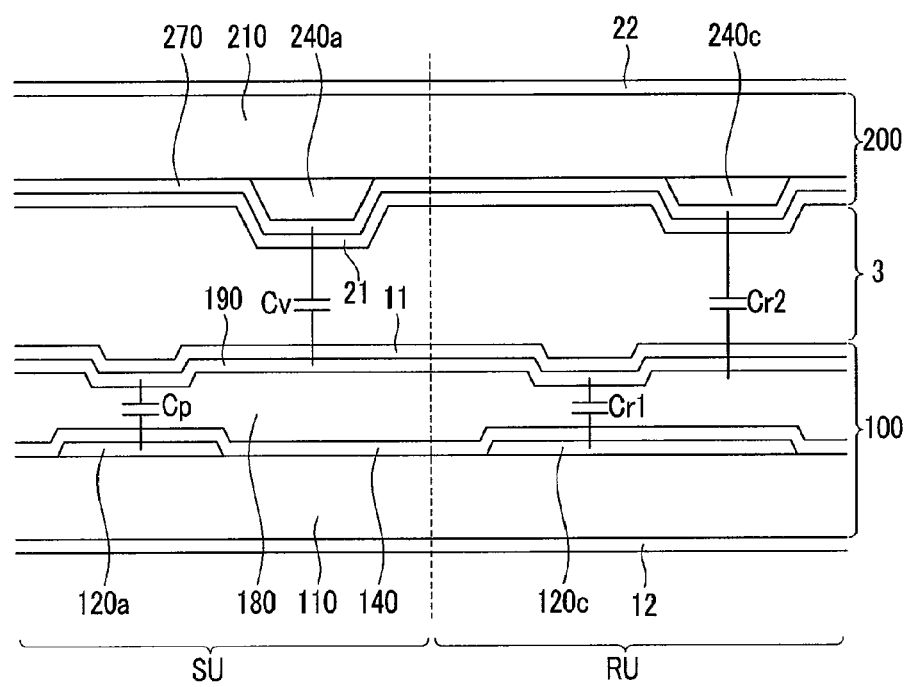
FIG. 16 is a cross-sectional view of another example of a sensing unit and a comparison signal generator of the liquid crystal display shown in FIG. 12 and FIG. 13.

FIG. 16 is a cross-sectional view showing another example of the sensing unit and the comparison signal generator of the liquid crystal display shown in FIG. 12 and FIG. 13.

Referring to FIG. 16, a liquid crystal display according to the present exemplary embodiment includes a lower panel 100 and an upper panel 200 facing each other, a liquid crystal layer 3 interposed between the display panels 100 and 200, and a pair of polarizers 12 and 22 respectively attached to the outer surfaces of the display panels 100 and 200, and also includes a sensing unit SU and a comparison signal generator RU.

The sensing unit SU is the same as that of the liquid crystal display of FIG. 14 such that the description thereof is omitted.

Regarding to the comparison signal generator RU, the third reference electrode 120c, a gate insulating layer 140, a sensing electrode 190, and an alignment layer 11 are sequentially formed on a lower substrate 110, and the third protrusion 240c, a common electrode 270, and an alignment layer 21 are sequentially formed on an upper substrate 210. The sensing electrode 190 forms the first comparison capacitor Cr1 along with the second reference electrode 120b, and the second comparison capacitor Cr2 along with the common electrode 270 disposed on the third protrusion 240c of the upper panel 200. In the liquid crystal display of FIG. 16, the height of the third protrusion 240c is lower than the height of the second protrusion 240c of FIG. 15 such that the influence by the external contact may be relatively reduced compared with the case of FIG. 15, and the second comparison capacitor Cr2 of the comparison signal generator RU and the variable capacitor Cv of the sensing unit SU may be similar to each other.

While this disclosure of invention has focused on what are presently considered to be practical exemplary embodiments, it is to be understood that the scope of the teachings here are not to be limited to the disclosed embodiments, but, on the contrary, is intended that the teachings cover various modifications and equivalent arrangements included within the spirit and scope of the teachings.

What is claimed is:

1. A touch sensitive liquid crystal display panel comprising:
    a plurality of subpixel units each comprising a liquid crystal capacitor having a pixel electrode and a common electrode of the display as two terminals with a liquid crystal layer interposed therebetween;
    a touch sensing unit for generating a sensing data signal in response to an external contact;
    a comparison signal generator for generating a comparison data signal regardless of the external contact; and
    a contact determining unit for comparing the sensing data signal and the comparison data signal to determine existence of contact,
    wherein the touch sensing unit comprises:
        a voltage resetting transistor, a gate of the voltage resetting transistor being connected to a present gate line,
        a variable capacitor having a capacitance that is changed by pressure, and having a first sensing electrode and the common electrode as two terminals,
        a sensing element generating a detection signal based on a control voltage from the variable capacitor, and
        a reference capacitor connected to the variable capacitor, and having the first sensing electrode and a previous gate line as two terminals, the previous gate line being a gate line activated ahead of the present gate line,
    wherein the common electrode has a portion formed on a first protrusion,
    wherein the first sensing electrode include a transparent conductive material and a conductive material connected to the transparent conductive material through a contact hole,
    wherein the transparent conductive material does not overlap the first protrusion when the transparent conductive material and the first protrusion are projected onto a first substrate on which the transparent conductive material is disposed,
    wherein the first sensing electrode is connected to a first transistor, a gate of the first transistor being connected to the present gate line,
    wherein the comparison signal generator comprises:
        a first comparison capacitor,
        a comparison element generating a detection signal based on the control voltage from the first comparison capacitor,
        a second comparison capacitor connected to the first comparison capacitor, and
        a second sensing electrode forming one terminal of a first comparison capacitor and a second comparison capacitor, and wherein the previous gate line forms the other terminal of the first comparison capacitor and the common electrode forms the other terminal of the second comparison capacitor.

2. The liquid crystal display of claim 1, further comprising a second protrusion protruded toward the second sensing electrode with respect to the common electrode,
   wherein the first protrusion protruded toward the first sensing electrode with respect to the common electrode; and
   wherein the height of the second protrusion is the same as or lower than the height of the first protrusion.

\* \* \* \* \*